(12) United States Patent
Kim (10) Patent No.: US 10,907,557 B2
(45) Date of Patent: Feb. 2, 2021

(54) ENGINE AND CONTROL METHOD THEREOF

(71) Applicants: Hyundai Motor Company, Seoul (KR); Kia Motors Corporation, Seoul (KR)

(72) Inventor: Jang Hun Kim, Suwon-Si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/581,989

(22) Filed: Sep. 25, 2019

(65) Prior Publication Data

US 2020/0325836 A1    Oct. 15, 2020

(30) Foreign Application Priority Data

Apr. 11, 2019   (KR) .......................... 10-2019-0042275

(51) Int. Cl.
| | |
|---|---|
| *F02D 41/00* | (2006.01) |
| *F02M 26/15* | (2016.01) |
| *F02M 26/00* | (2016.01) |
| *F02M 26/29* | (2016.01) |
| *F02M 26/65* | (2016.01) |
| *F02M 26/24* | (2016.01) |

(52) U.S. Cl.
CPC .......... *F02D 41/005* (2013.01); *F02M 26/15* (2016.02); *F02M 26/24* (2016.02); *F02M 26/29* (2016.02); *F02M 26/65* (2016.02); *F02M 2026/006* (2016.02)

(58) Field of Classification Search
CPC ...... F02D 41/005; F02M 26/15; F02M 26/65; F02M 26/24; F02M 26/29; F02M 2026/006
See application file for complete search history.

(56) References Cited

U.S. PATENT DOCUMENTS

| | | | | |
|---|---|---|---|---|
| 4,351,304 | A * | 9/1982 | Schweizer ............. | F02M 69/04 123/472 |
| 4,856,473 | A * | 8/1989 | Kawai ................... | F02B 31/082 123/308 |
| 4,969,446 | A * | 11/1990 | Olsson ................... | F02M 25/00 123/585 |

(Continued)

FOREIGN PATENT DOCUMENTS

KR    10-2015-0106194 A    9/2015

*Primary Examiner* — Phutthiwat Wongwian
*Assistant Examiner* — Sherman D Manley
(74) *Attorney, Agent, or Firm* — Morgan, Lewis & Bockius LLP (57) ABSTRACT

An engine and a method of controlling the engine may include an EGR injector provided such that EGR gas sprays that are injected toward a side wall of a combustion chamber reach the side wall of a combustion chamber, simultaneously; an EGR pipe connecting the EGR injector to an exhaust system of the engine and ejecting exhaust gas from the exhaust system; an EGR pump mounted in the EGR pipe and pumping the exhaust gas in the EGR pipe to supply the exhaust gas to the EGR injector; and controller connected to the EGR pump and the EGR injector and configured for controlling the EGR pump and the EGR injector so that the EGR injector injects EGR gas into the combustion chamber.

18 Claims, 7 Drawing Sheets

(56) References Cited

U.S. PATENT DOCUMENTS

| | | | |
|---|---|---|---|
| 7,188,587 B1 * | 3/2007 | Quader | F02D 19/00 123/26 |
| 2002/0162544 A1 * | 11/2002 | Cho | F02M 69/044 123/568.15 |
| 2010/0163006 A1 * | 7/2010 | Otsubo | F02M 26/71 123/568.2 |

* cited by examiner

ENGINE AND CONTROL METHOD THEREOF

CROSS REFERENCE TO RELATED APPLICATION

The present application claims priority to Korean Patent Application No. 10-2019-0042275, filed Apr. 11, 2019, the entire contents of which is incorporated herein for all purposes by this reference.

BACKGROUND OF THE PRESENT INVENTION

Field of the Invention

The present invention relates to an exhaust gas recirculation apparatus for an engine.

Description of Related Art

Generally, an exhaust gas recirculation (EGR) apparatus has been used to suppress generation of NOx in an engine by recirculating exhaust gas which is discharged from an engine after combustion in the engine into a combustion chamber thus reducing a combustion chamber temperature.

A conventional EGR apparatus is configured to supply exhaust gas ejected from downstream of an exhaust manifold or an after-treatment device of an engine to an air intake manifold through an EGR line. The EGR apparatus controls the opening ratio of the EGR line using an EGR valve, so that EGR quantity flowing into the combustion chamber may be controlled.

In the EGR apparatus, since an EGR quantity is sufficiently influenced by air intake/exhaust pressures of the engine, there is a problem that a desired EGR quantity cannot be secured due to an increase in the pressure at the side of the air intake manifold in an area of high engine load or an area of high engine rpm.

Furthermore, even when the EGR valve is controlled to secure the desired EGR quantity based on the current state of the combustion chamber, GR gas controlled by the EGR valve reaches the combustion chamber after time delay. Therefore, there is a limit in controlling EGR quantity suitable for a current combustion state of the engine.

Meanwhile, a compression ignition engine such as a diesel engine requires an ignition delay period of a proper duration, to increase the mixing ratio of fuel and air that are injected into the combustion chamber and to provide a condition for smooth combustion of fuel.

As methods for securing the ignition delay period, there are methods of reducing the compression ratio, increasing the EGR quantity, the delaying fuel injection timing and the like. However, the delaying fuel injection timing does not help to increase the mixing ratio of fuel and air, and the increase in the EGR quantity and the reduction in the compression ratio involve side effects such as excessive HC and CO in exhaust gas, combustion stability degeneration, and increased soot.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing an engine and a control method of the engine. Wherein an optimal exhaust gas recirculation (EGR) quantity currently required in a combustion chamber of the engine is immediately and precisely supplied to the combustion chamber so that generation of NOx in the engine may be efficiently suppressed. Furthermore, an ignition delay period and combustion of fuel injected into the combustion chamber are appropriately controlled so that the mixing ratio of fuel and air may be increased and more ideal combustion may be realized.

In various aspects of the present invention, there is provided an engine including: an EGR injector connected to a combustion chamber of the engine to inject EGR gas into the combustion chamber of the engine; an EGR pipe connecting the EGR injector to an exhaust system of the engine and ejecting exhaust gas from the exhaust system; an EGR pump mounted in the EGR pipe and pumping the exhaust gas in the EGR pipe to supply the exhaust gas to the EGR injector; and a controller connected to the EGR pump and the EGR injector and configured for controlling the EGR pump and the EGR injector so that the EGR injector injects the EGR gas into the combustion chamber.

The EGR injector may be mounted in the combustion chamber so that a plurality of EGR gas sprays that are injected toward a side wall of the combustion chamber reach the side wall of the combustion chamber, simultaneously.

The EGR injector may be mounted in an upper side of the combustion chamber.

The EGR injector may be mounted in a center portion of the combustion chamber.

The controller may be configured to inject the EGR gas through the EGR injector before fuel is injected into the engine.

The controller may be configured to inject the EGR gas through the EGR injector after an air intake valve of the engine is closed.

Furthermore, in various aspects of the present invention, there is provided a control method of the engine, the control method may include: receiving, by the controller, engine operating information; determining, by the controller, whether or not current engine operation area requires exhaust gas recirculation, by use of the input engine operating information; and when it is determined that the current operation area requires the exhaust gas recirculation, operating, by the controller, the EGR injector after the air intake valve is closed and before fuel injection begins, and allowing the EGR injector to inject EGR gas into the combustion chamber.

The controller may increase an ignition delay period of fuel by increasing injection quantity of the EGR gas.

When it is necessary to ignite fuel early, the controller may be configured to control fuel ignition timing in the combustion chamber by reducing injection quantity of the EGR gas.

When it is necessary to ignite fuel early, the controller may reduce the injection quantity of the EGR gas to zero.

The controller may be configured to control EGR gas injection to be performed several times.

Furthermore, in various aspects of the present invention, the control method may include: when an engine demand torque is equal to or greater than a predetermined reference torque, reducing, by the controller, injection quantity of EGR gas injected into the combustion chamber.

The controller may reduce the injection quantity of the EGR gas injected into the combustion chamber depending on an increase in the engine demand torque.

According to an exemplary embodiment of the present invention, since the optimal EGR quantity currently required in the combustion chamber of the engine is immediately and precisely supplied into the combustion chamber of the engine, generation of NOx in the engine may be effectively suppressed. Furthermore, since the ignition delay period and combustion of fuel injected into the combustion chamber are appropriately controlled, the mixing ratio of fuel and air may be increased and more ideal combustion may be realized.

Furthermore, according to an exemplary embodiment of the present invention, since the fuel EGR gas injected into the combustion chamber effectively blocks combustion energy from being transmitted to the side wall of the combustion chamber, an increase in the temperature at the side wall of the combustion chamber is effectively suppressed, and thus fuel efficiency may be improved.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Figure 1:
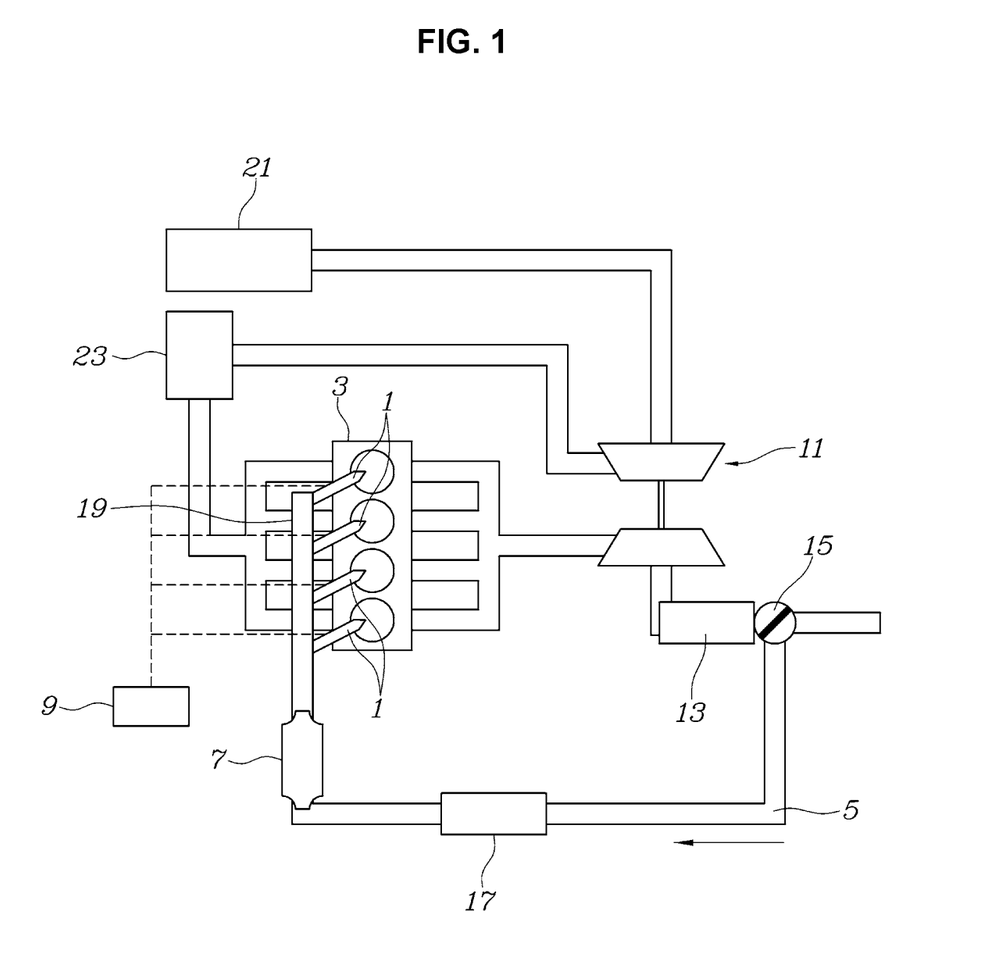
FIG. 1 is a conceptual diagram of an engine according to an exemplary embodiment of the present invention.
Figure 2:
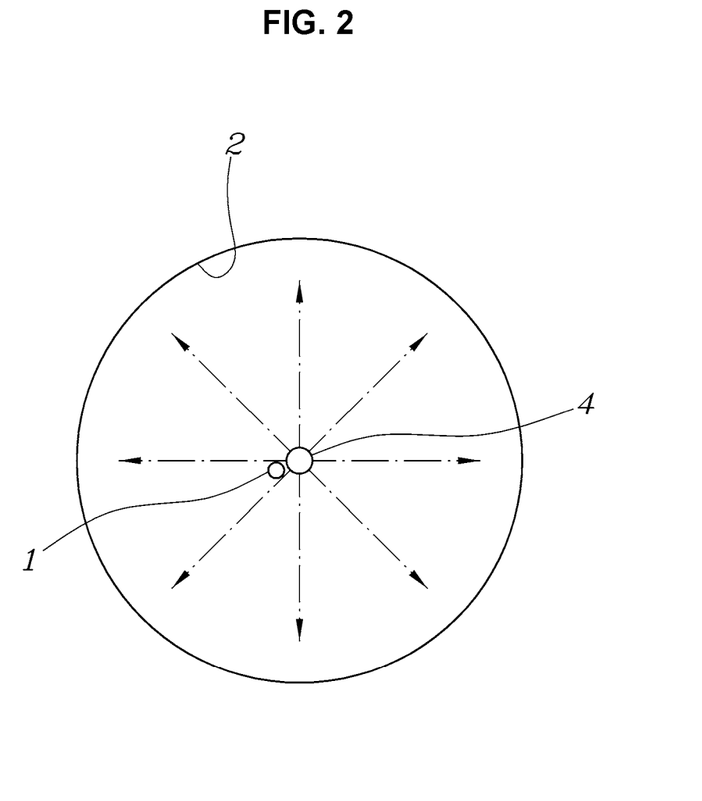
FIG. 2 is a view showing an example in which a fuel injector and an exhaust gas recirculation (EGR) injector are mounted in an upper side of a combustion chamber of the engine according to an exemplary embodiment of the present invention.

Referring to FIG. 1 and FIG. 2, an engine according to an exemplary embodiment of the present invention includes: an EGR injector 1 which is mounted in a combustion chamber so that EGR gas sprays that are injected toward a side wall 2 of the combustion chamber simultaneously reach the side wall 2 of the combustion chamber; an EGR pipe 5 ejecting exhaust gas from an exhaust system of the engine 3; an EGR pump 7 pumping the exhaust gas in the EGR pipe 5 to supply the exhaust gas to the EGR injector 1; and a controller 9 controlling the EGR pump 7 and the EGR injector 1 so that the EGR injector 1 injects EGR gas into the combustion chamber.

That is, the engine of the present invention injects EGR gas using the EGR injector 1, and allows injected EGR gas sprays to be simultaneously attached to the side wall 2 in the circular combustion chamber. As such, ignition delay and combustion of injected fuel are controlled, increasing the fuel-air mixing ratio, and facilitating more ideal combustion. That is, since the engine is configured to reduce noxious exhaust materials and to improve thermal efficiency, fuel efficiency of a vehicle in which the engine is mounted may be improved.

Figure 5:
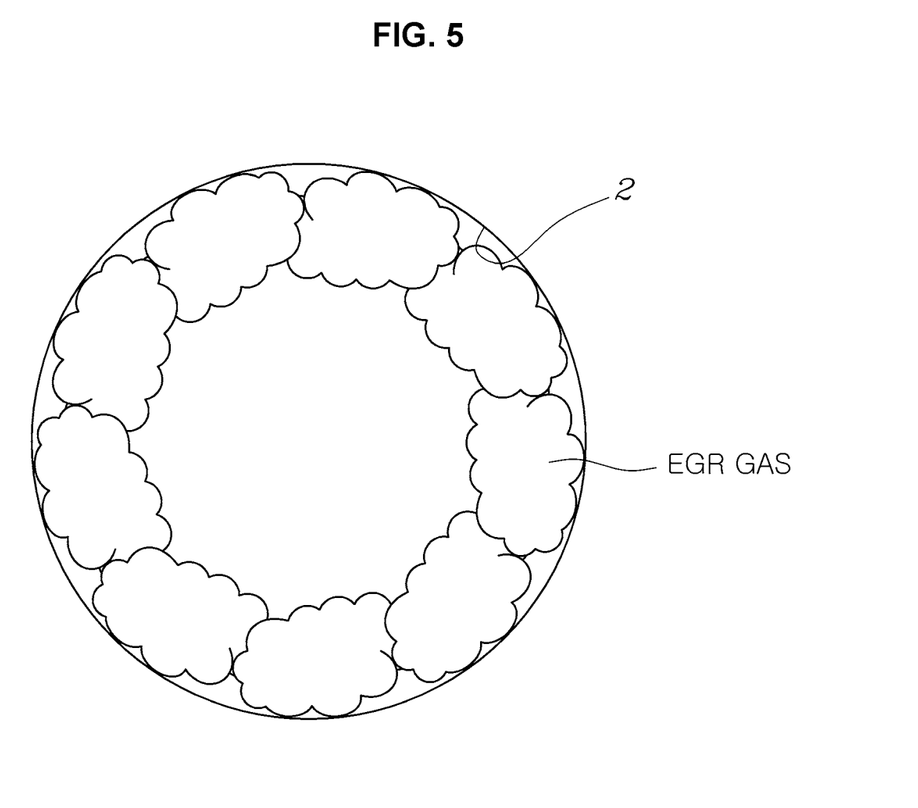
FIG. 5, FIG. 6 and FIG. 7 are views showing a combustion process in the combustion chamber wherein combustion is performed by adjusting the ignition delay period according to an exemplary embodiment of the present invention.

The EGR injector 1 is mounted on a central upper side of the combustion. For example, since the EGR injector 1 is mounted near a fuel injector 4 which is typically mounted on the central upper side of the combustion chamber as shown in FIG. 2, when the EGR injector 1 injects EGR gas, EGR gas sprays simultaneously reach the side wall 2 of the circular combustion chamber, as shown in FIG. 5.

Of course, the EGR injector 1 is preferably mounted near the fuel injector 4 within a range in which the EGR injector 1 does not interfere with the fuel injector 4. In addition, the EGR injector 1 is preferably mounted not to screen fuel sprays as shown in arrow directions in FIG. 2.

Contrarily, the fuel injector 4 is preferably mounted at an angle which is separated from paths of EGR gas injected by the EGR injector 1.

For reference, as shown in FIG. 1, the engine 3 is provided with an after-treatment device 13 on a downstream of a turbo charger 11. The engine 3 is connected to the EGR pipe 5 through a switching valve 15 to switch situations from a situation in which exhaust gas is discharged from the after-treatment device 13 to an exhaust pipe and a situation in which exhaust gas is supplied to the EGR pipe 5. The engine 3 is provided with an exhaust gas recirculation (EGR) cooler 17 on the EGR pipe 5 to cool EGR gas which is exhaust gas.

The engine is configured such that EGR gas cooled in the EGR cooler 17 is pumped by the EGR pump 7 and stored in an EGR rail 19, and then the EGR gas may be supplied to the combustion chamber directly as a plurality of EGR injectors 1 are separately opened due to control of the controller 9.

Meanwhile, the engine is configured such that air filtered in an air cleaner 21 is supplied to a compressor of the turbo charger 11 and compressed, compressed air is cooled in an intercooler 23, and cooled air is supplied to each combustion chamber of the engine through an air intake manifold.

For reference, the controller 9 may be incorporated in an engine controller 9 for controlling the fuel injector 4 and the like of the engine, and may be separately configured to control the EGR injector 1 so that the controller 9 may perform control by mutual-communication with the engine controller 9.

Furthermore, ejection of exhaust gas from an exhaust system of the engine by the EGR pipe 5 means both cases of exhaust gas ejected from a downstream of the after-treatment device 13 and exhaust gas ejected from an upstream thereof. The EGR pipe 5 may be mounted to eject exhaust gas from the upstream of the after-treatment device 13, and of course in the instant case, the EGR pipe 5 may be provided with a separate filter in consideration of a blockage in the EGR injector 1.

Figure 3:
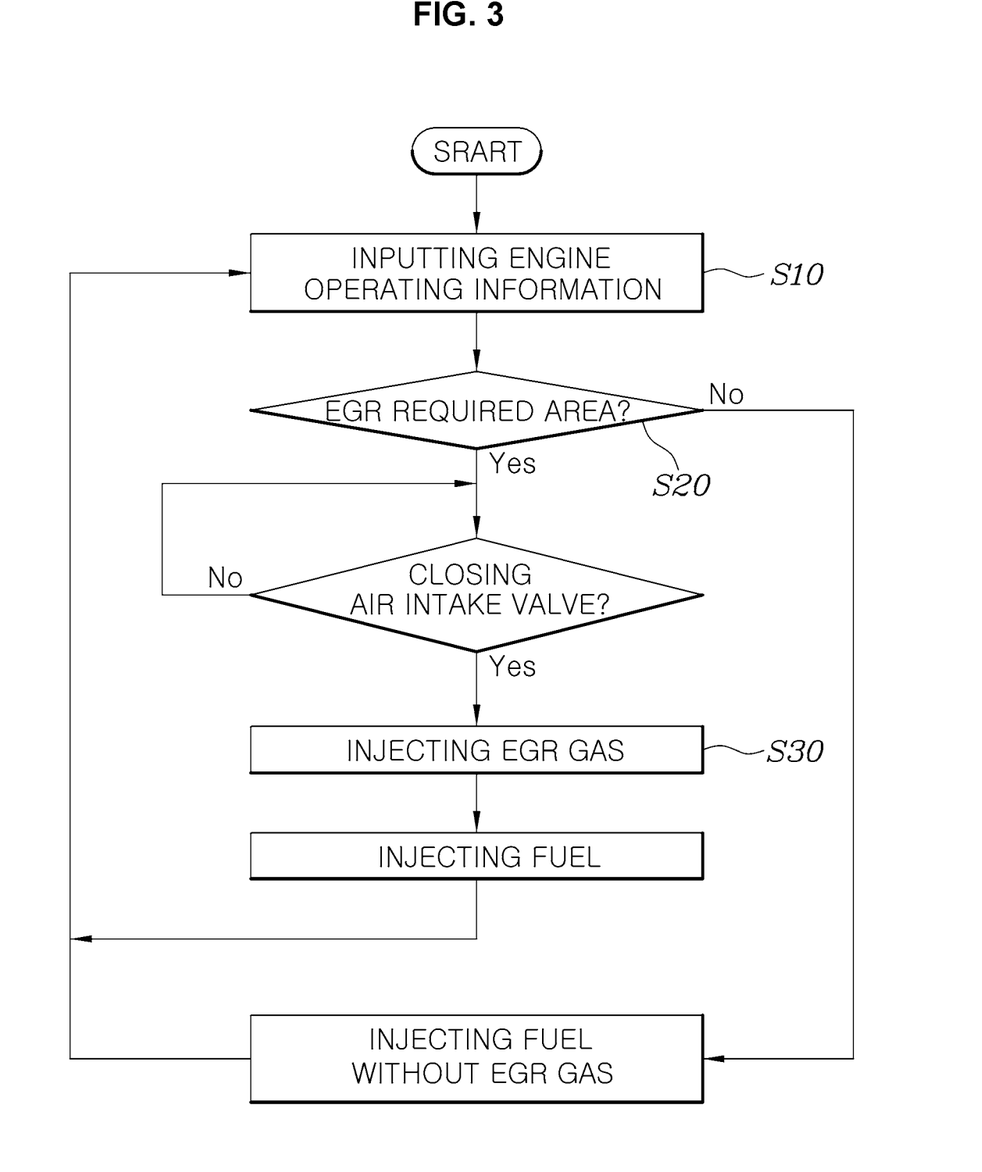
FIG. 3 is a flowchart showing an exemplary embodiment of a control method of the engine according to an exemplary embodiment of the present invention.

An exemplary embodiment of a control method of the engine of the present invention includes: inputting engine operating information to the controller 9 (S10); determining, by the controller 9, whether or not current engine operation area requires EGR, by use of the input engine operating information (S20); and when it is determined that the operation area requires EGR, operating, by the controller 9, the EGR injector 1 after an air intake valve is closed and before fuel injection begins, and allowing the EGR injector 1 to inject EGR gas into the combustion chamber (S30), as shown in FIG. 3.

That is, when the controller 9 has received the engine operating information such as engine RPM, crank angle, fuel injection timing, BMEP (brake mean effective pressure), temperature of cooling water, combustion chamber pressure, etc., and determined that the engine operation area requires EGR, the controller 9 operates the EGR injector 1 during a period after the air intake valve of the engine is closed and before fuel injection begins, so that the EGR gas is injected into the combustion chamber.

The controller 9 controls to increase an ignition delay period of fuel by increasing the injection quantity of EGR gas. When early ignition of fuel is necessary, the controller 9 reduces the injection quantity of EGR gas to zero.

That is, as the injection quantity of EGR gas is increased, the ignition delay period of fuel is increased.

Figure 4:
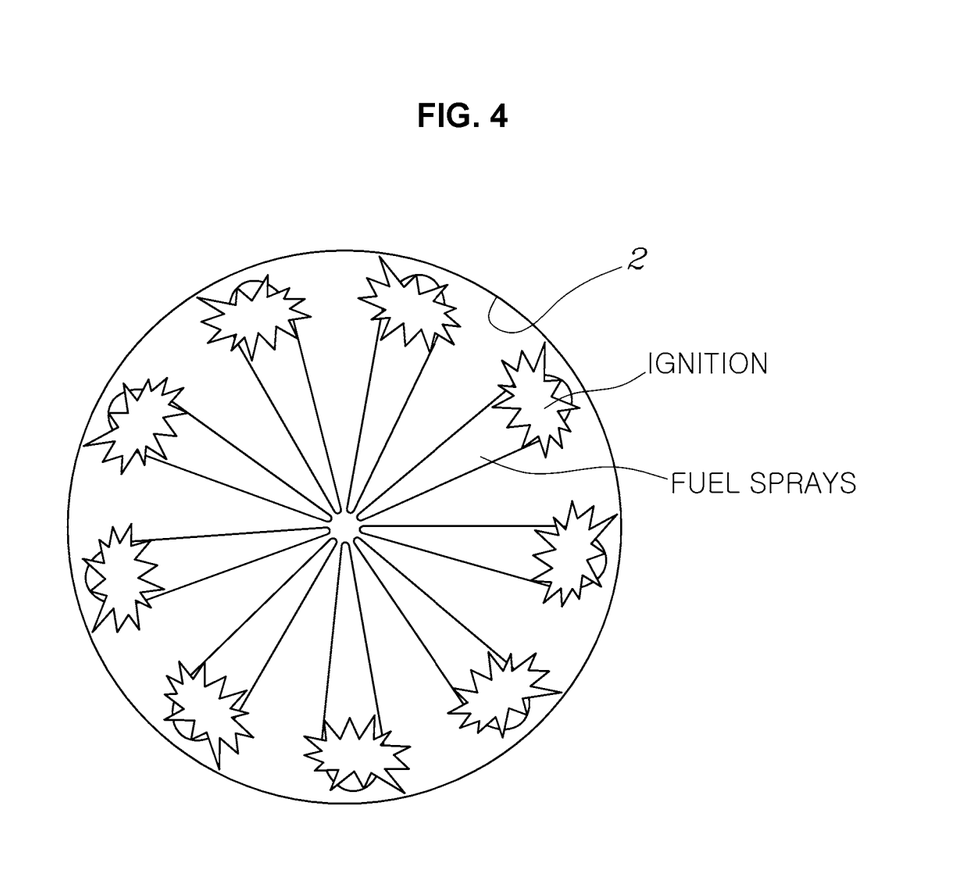
FIG. 4 is a view showing a combustion chamber in a case of a conventional compression ignition engine, wherein injected fuel is ignited in the combustion chamber in which EGR gas distribution is entirely equal in the combustion chamber since EGR gas is injected into air inhaling into the combustion chamber.

FIG. 4 is a view showing fuel ignition, wherein injected fuel is ignited in the combustion chamber having a homogeneous level of EGR gas distribution by mixing EGR gas and intake air in a conventional compression ignition engine in advance and flowing the mixed gas into the combustion chamber and not the EGR gas injection by the EGR injector 1 according to an exemplary embodiment of the present invention. As shown in FIG. 4, when fuel is injected from the fuel injector 4, ignition starts near the side wall 2 of the combustion chamber.

As described above, combustion is performed by a method in which flame comes down into a center portion of the combustion chamber after ignition starts near the side wall 2 of the combustion chamber.

In a state like FIG. 4, since concentrations of EGR gas are the same at a position near the side wall 2 of the combustion chamber in which combustion starts and at the center portion of the combustion chamber in which the combustion does not start, it is difficult to extend the ignition delay period by EGR gas.

That is, to extend the ignition delay period longer, EGR gas near the side wall 2 in which combustion starts should be densified to delay fuel ignition. Like a conventional case in which EGR gas concentration is entirely equal in the combustion chamber by mixing EGR gas and the intake air and flowing the mixed gas into the combustion chamber, when EGR gas concentration reaches a level for inducing ignition delay, there occur problems that fuel combustion is unstable in addition to ignition delay.

Figure 6:
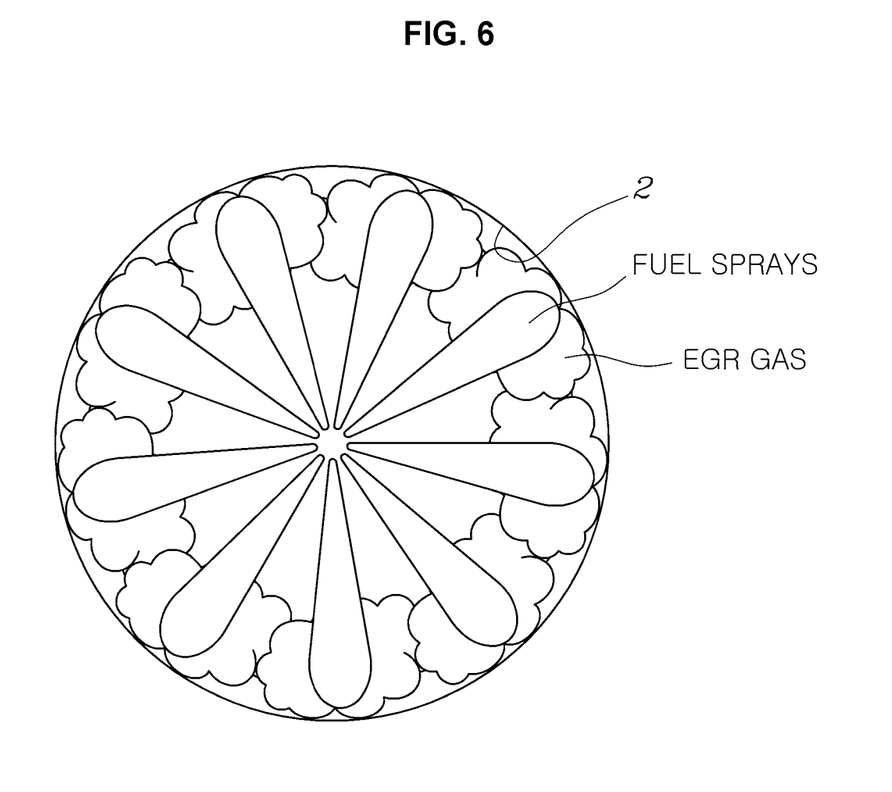
Figure 7:
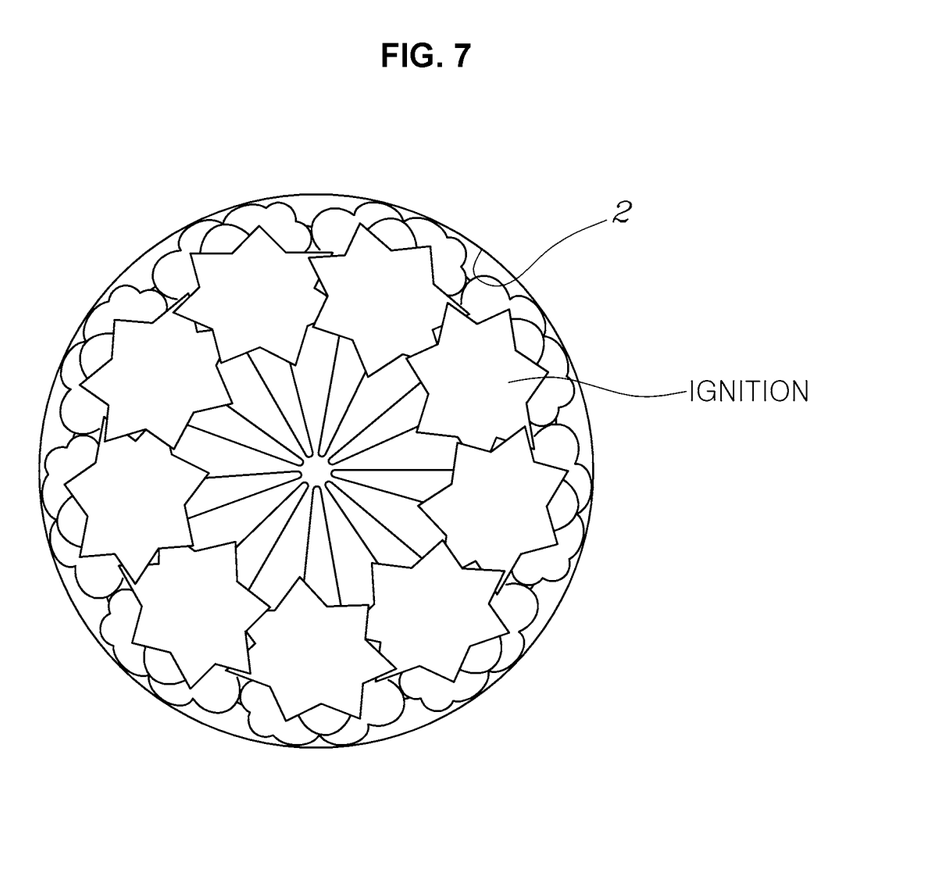

However, in the engine of the present invention having the EGR injector 1 described above, the controller 9 controls the EGR injector 1 to directly inject EGR gas into the combustion chamber, so that EGR gas concentration is partially densified near the side wall 2 of the combustion chamber. When the fuel injector 4 injects fuel, the fuel is delayed due to high EGR gas concentration near the side wall 2 of the combustion chamber as shown in FIG. 6, and fuel ignition is performed as shown in FIG. 7. After fuel ignition, as flame is rapidly transferred to the center portion of the combustion chamber at which EGR gas concentration is low, the desired level of ignition delay period may be secured and smooth combustion can be performed.

Therefore, according to an exemplary embodiment of the present invention, the ignition delay period can be increased by adjusting the injection quantity of EGR gas of the EGR injector 1, early ignition can be induced by reducing the injection quantity of EGR gas, and the EGR gas distribution in the combustion chamber can be finely adjusting by injecting EGR gas several times so that fuel combustion can be controlled over a wide range. Accordingly, since the mixing ratio of fuel and air is increased and stable and efficient combustion is performed, noxious material content of exhaust gas can be significantly reduced, and fuel efficiency of the vehicle can be improved.

Furthermore, when an engine demand torque is equal to or greater than a predetermined reference torque, the controller 9 can controls the EGR injector to reduce the injection quantity of EGR gas into the combustion chamber.

That is, when the engine demand torque is a high toque which is equal to or greater than the predetermined reference torque by the engine operated in a high load area, the controller 9 controls to reduce the injection quantity of EGR gas to zero, and allows the engine to be operated in a state suitable for generating the engine demand torque.

Accordingly, the reference torque is preferably set to a level at which it may be confirmed that the engine enters an operation area in which engine output is prioritized over effects due to the EGR gas injection by the EGR injector, and the reference torque may be appropriately designed by performing a plurality of experiments and analyses.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. An engine comprising:
   an exhaust gas recirculation (EGR) injector connected to a combustion chamber of the engine to inject EGR gas into the combustion chamber of the engine;

an EGR pipe connecting the EGR injector to an exhaust system of the engine and ejecting exhaust gas from the exhaust system;

an EGR pump mounted in the EGR pipe and pumping the exhaust gas in the EGR pipe to supply the exhaust gas to the EGR injector; and a controller connected to the EGR pump and the EGR injector and configured for controlling the EGR pump and the EGR injector so that the EGR injector injects the EGR gas into the combustion chamber, wherein the EGR injector is mounted in an upper side of the combustion chamber, and wherein the EGR injector is mounted in a center portion of the combustion chamber.

2. The engine of claim 1, wherein the EGR injector is mounted in the combustion chamber so that a plurality of EGR gas sprays that are injected toward an inner circumference of the combustion chamber reach the inner circumference of the combustion chamber, simultaneously.

3. The engine of claim 1, wherein the controller is configured to inject the EGR gas through the EGR injector before fuel is injected into the engine.

4. The engine of claim 1, wherein the controller is configured to inject the EGR gas through the EGR injector after an air intake valve of the engine is closed.

5. The engine of claim 4, wherein the controller is configured to inject the EGR gas through the EGR injector before fuel is injected into the engine.

6. The engine of claim 1, wherein the controller is configured of:

receiving engine operating information;

determining when current engine operation area requires exhaust gas recirculation, by use of the received engine operating information; and in a response that it is determined by the controller that the current operation area requires the exhaust gas recirculation, operating the EGR injector after an air intake valve is closed and before fuel injection begins, and allowing the EGR injector to inject the EGR gas into the combustion chamber.

7. The engine of claim 6, wherein the controller is configured to increase an ignition delay period of fuel by increasing injection quantity of the EGR gas.

8. The engine of claim 6, wherein the controller is configured to control fuel ignition timing in the combustion chamber by reducing injection quantity of the EGR gas with a predetermined injection quantity.

9. The engine of claim 6, wherein the controller is configured to control EGR gas injection to be performed in predetermined times.

10. The engine of claim 1, wherein the controller is configured of:

upon determining that an engine demand torque is equal to or greater than a predetermined reference torque, reducing injection quantity of the EGR gas injected into the combustion chamber with a predetermined injection quantity.

11. The engine of claim 10, wherein the controller is configured to reduce the injection quantity of the EGR gas injected into the combustion chamber with the predetermined injection quantity, depending on an increase in the engine demand torque.

12. A control method of the engine of claim 1, the control method comprising:

receiving, by the controller, engine operating information;

determining, by the controller, when current engine operation area requires exhaust gas recirculation, by use of the received engine operating information; and in a response that it is determined that the current operation area requires the exhaust gas recirculation, operating, by the controller, the EGR injector after an air intake valve is closed and before fuel injection begins, and allowing the EGR injector to inject the EGR gas into the combustion chamber.

13. The control method of claim 12, wherein the controller is configured to increase an ignition delay period of fuel by increasing injection quantity of the EGR gas.

14. The control method of claim 12, wherein the controller is configured to control fuel ignition timing in the combustion chamber by reducing injection quantity of the EGR gas with a predetermined injection quantity.

15. The control method of claim 14, wherein, the predetermined injection quantity is zero so that the controller is configured to reduce the injection quantity of the EGR gas to the zero.

16. The control method of claim 12, wherein the controller is configured to control EGR gas injection to be performed in predetermined times.

17. A control method of the engine of claim 1, the control method comprising:

upon determining that an engine demand torque is equal to or greater than a predetermined reference torque, reducing, by the controller, injection quantity of the EGR gas injected into the combustion chamber with a predetermined injection quantity.

18. The control method of claim 17, wherein the controller is configured to reduce the injection quantity of the EGR gas injected into the combustion chamber with the predetermined injection quantity, depending on an increase in the engine demand torque.

* * * * *